United States Patent [19]

Ueda et al.

[11] Patent Number: 4,537,732
[45] Date of Patent: Aug. 27, 1985

[54] SYSTEM AND PROCESS FOR PRODUCING MOLDED OPTICAL ELEMENTS

[75] Inventors: Hiroshi Ueda, Nara; Mitsuru Saito, Kaizuka; Hideo Kajita, Chihayaakasaka, all of Japan

[73] Assignee: Minolta Camera Kabushiki Kaisha, Osaka, Japan

[21] Appl. No.: 612,062

[22] Filed: May 17, 1984

Related U.S. Application Data

[63] Continuation of Ser. No. 156,064, Jun. 2, 1980, abandoned.

[30] Foreign Application Priority Data

Jun. 19, 1979 [JP] Japan ................... 54-77714

[51] Int. Cl.³ ............................................. B29D 11/00
[52] U.S. Cl. .................... 264/1.1; 33/180 R; 65/158; 249/53 R; 264/40.1; 350/409; 351/159; 425/169; 425/808
[58] Field of Search ............ 350/409; 351/159; 264/1.1, 2.2, 2.7, 40.1, 40.2; 249/53 R; 425/169, 808; 65/158; 33/174 A, 174 P, 180 R

[56] References Cited

U.S. PATENT DOCUMENTS

| 3,118,198 | 1/1964 | Prunier ............................ 264/1.1 |
| 3,505,861 | 4/1970 | Schoefer et al. .................. 73/105 |
| 3,970,362 | 7/1976 | Laliberte ......................... 425/808 |
| 3,973,837 | 8/1976 | Page ............................ 351/160 R |
| 3,973,838 | 8/1976 | Page ............................ 351/160 R |
| 4,171,576 | 10/1979 | Lagorsse et al. ................ 33/174 A |

FOREIGN PATENT DOCUMENTS 2216089 8/1974 France ................... 264/22

OTHER PUBLICATIONS

"Spectacle Lens Technology", Horne, Crane, Russak and Co., N.Y.C., 1978, p. 118.

*Primary Examiner*—James Lowe
*Attorney, Agent, or Firm*—Joseph W. Price

[57] ABSTRACT

A system in process for producing an improved plastic molded optical element such as a mirror or lens is provided. The molded optical body has at least a surface portion designed for effective interfacing with incident light by reflection or refraction. Discontinuities form reference points at fixed positions on the molded optical surface. The reference points can include a projection or recess formed at the center of the lens system on the optical axis having a sufficient magnitude in size for measurement to determine a spatial position of the optical element but limited in size to prevent any perceptible aberration to be introduced within the desired application of the optical element.

17 Claims, 12 Drawing Figures

SYSTEM AND PROCESS FOR PRODUCING MOLDED OPTICAL ELEMENTS

This is a continuation of application Ser. No. 156,064, filed on June 2, 1980 and now abandoned.

BACKGROUND OF THE INVENTION:

1. Field of the Invention

The present invention relates to a molded optical element, such as a lens, mirror or the like, and more particularly, to an improved plastic molded optical element for facilitating optical surface inspection on a mass production basis.

2. Description of the Prior Art

The art of plastic injection molding of optical elements such as camera lenses has advanced and become more accepted in higher quality optical systems. This has resulted from an increase in labor costs and the fact that both the molding art and plastic material utilized have become more dependable on a mass production basis. The use of plastic lenses, for example in photography, has further provided optical designers with an economical method of providing aspherical surfaces for controlling various aberrations in a lens system.

The traditional method of grinding and polishing glass lens elements provided a high degree of reliability although it is relatively time consuming and expensive from a labor viewpoint. When a glass lens element is finished, there is a relatively high confidence level that the optical surface of the lens element is free of any defects.

The molding of plastic lens elements has lessened both the time and the labor required; however, the same level of confidence of optical accuracy is not as easily obtained. The quality of plastic material, the existence of gaseous bubbles and even the ambient temperature and humidity can affect the surface quality of the resulting molded optical element.

Frequently, the prior art has utilized a form measuring instrument to scan the optical surface along a given line and measured the relative height of that surface at each point by an electrical comparator. Any resulting measured errors are appropriately noted and if beyond the tolerance requirements would result in rejecting that particular optical element. In making these surface measurments, the scan path is usually traced along a line running through the center of the optical surface to be inspected. It has, however, been very difficult to determine whether the scanning is truly made along the desired line. This is particularly true in a mass production environment. Usually the scanning path or line was determined in accordance with an operator's experience or his reliance upon the output of a form measuring instrument based on the assumption that the output of this instrument would disclose either a maximum or minimum value at the center of the surface being measured. The reliance upon an operator's experience, however, adds an undesirable subjective possibility of error while the other method is inherently faulty in that it cannot indicate the center if the optical element is not properly aligned, such as when the surface to be measured is inclined relative to the measuring instrument. As a result, the prior art is still attempting to improve quality control on the inspection of molded plastic optical elements for mass production.

Cited of general interest is U.S. Pat. No. 4,015,897 which discloses plastic molded lenses for use on a camera and more particularly discloses a pair of meniscus lenses with molded integral peripheral flanges for mounting and spacing the lenses in the lens barrel.

SUMMARY OF THE INVENTION

The present invention is directed to a molded optical element for example, a plastic of the type requiring a precise predetermined surface configuration for a controlled interfacing with incident light by reflection or refraction. The improved optical element comprises a molded optical body having at least a portion of the surface designed for effective interfacing with incident light. Reference means or index means are located at a fixed relative position to the optical axis of the surface. The reference means forms a discontinuity in the configuration of the predetermined surface of sufficient magnitude to permit measurement and determination of its spatial position but is of a limited size or dimension to prevent any perceptible aberration to be introduced by this discontinuity within the desired application of the optical element.

Preferably, one or more discontinuities are predeterminedly positioned and include, for example, a projection or recess on the optical axis and a peripheral projection or recess outside of the effective optical surface. These reference means can interface directly with an electrical comparator or a testplate to insure alignment with the optical element and further, to guarantee that the scan line or path is taken along the desired direction. A primary object of the present invention is achieved in providing an improved molded optical element which allows an accurate and easy surface form measurement or inspection on a mass production basis.

The features of the present invention which are novel are set forth with particularity in the appended claims. The present invention, both as to its organization and manner of operation, together with further objects and advantages thereof, may be best understood by reference to the following, taken in conjunction with the accompanying drawings.

BRIEF DESCRIPTION OF THE PREFERRED EMBODIMENTS

The following description is provided to enable any person skilled in the optical art to make and use the invention and sets forth the best modes contemplated by the inventors of carrying out their invention. Various modifications, however, will remain readily apparent to those skilled in the art since the generic principles of the present invention have been defined herein specifically to provide an improved molded optical element that can be manufactured in a relatively economical manner while maintaining a high degree of quality control.

Figure 1A:
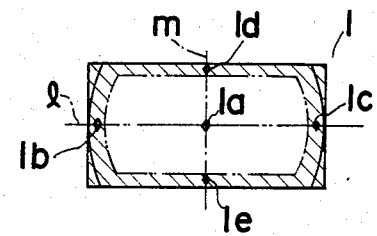
FIG. 1a is a front elevational view of a first embodiment of the present invention applied to a plastic lens.
Figure 1B:
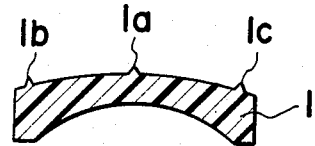
FIG. 1b is a cross-sectional view thereof.
Figure 2:
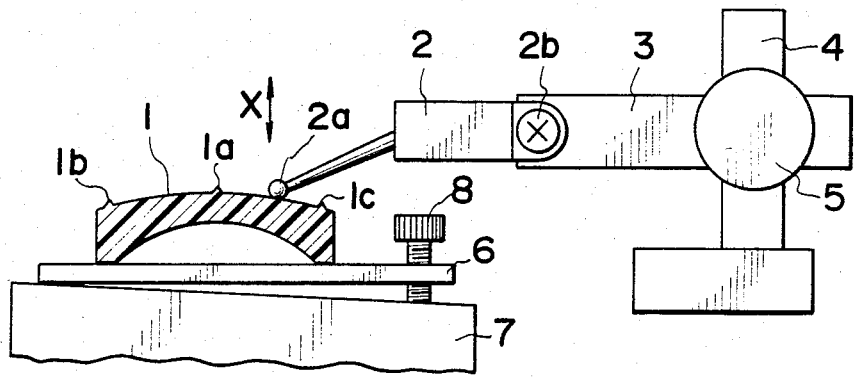
FIG. 2 illustrates an arrangement for measuring the curvature of the plastic lens by using a form measuring instrument.

FIGS. 1 through 3 illustrate a first embodiment of the present invention, including the apparatus for performing the actual measurement of the optical surface and the resulting graphs produced thereby. Referring specifically to FIG. 1, an oblong plastic lens element is disclosed having a surface portion symmetrical about its optical axis for effective interfacing with incident light. Molded onto the surface of the plastic lens 1 are integral projections 1a, 1b, 1c, 1d, and 1e of a conical or pyramidal configuration. Each of these projections are identical in shape to each other and equal in height from the lens surface. The cross-hatched or broken line peripheral area in FIG. 1a denotes that portion of the lens which is not used for interfacing with incident light, e.g., converging or diverging light rays to form an effective image. In other words, the portion closed by the broken line is within the light path of an optical system including the lens 1. The hatched portion outside of the effective portion is not used for transmitting light rays.

Projection 1a is located on the surface of the plastic lens and is coincident with the optical axis of the lens. The other projections 1b through 1e are located within the ineffective portion of the plastic lens 1. For point of reference, the straight lines that are dissecting FIG. 1a, $l$ and $m$, are respectively perpendicular to the optical axis and intersect each other at right angles. Projections 1b and 1c are on the straight line 1 and are symmetrically positioned with respect to the optical axis while projections 1d and 1e are on the straight line $m$ and are also symmetrically positioned relative to the same optical axis. Each pair of projections 1b and 1c and 1d and 1e are diametrically opposite to each other. FIG. 1b is a cross-sectional view of the plastic lens 1 of FIG. 1a taken along the straight line 1 shown in FIG. 1a.

In FIG. 2, a schematic illustration of a machine for actually measuring the curvalinear form or shape of the optical surface of the plastic lens 1 is disclosed. As can be appreciated, the optical surface can be spherical or aspherical as preferred by the optical designer. An electrical comparator or transducer 2 is used as a detector in the form measuring instrument. The stylus or measuring point 2a of the comparator 2 is supported so that it may be freely moved in the direction of arrow X. Any shift or displacement of the measuring point 2a in this direction is transmitted as an input to the electrical comparator 2 and automatically converted into an electrical signal which is generated as an output. The electrical comparator 2 is fixed to a support arm 3 by screw 2b and this support arm 3 is further vertically movable along the vertical support member 4 and is held at any specific position by the lock member 5.

A mounting table 6 is used to support the optical element 1 while it is being inspected. The mounting table 6 is adjustably connected to a movable table 7 that can be shifted horizontally in a Y-Z direction by a conventional drive system (not shown) at a predetermined speed. The adjustment screw 8 may be rotated to adjust the inclination of the mounting table 6 relative to the movable table 7.

Figure 3A:
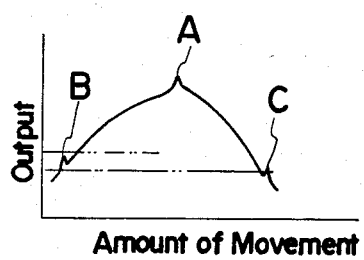
FIGS. 3a, 3b and 3c are graphs showing the outputs of the form measuring instrument.
Figure 3B:
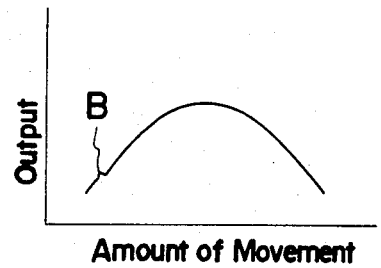
Figure 3C:
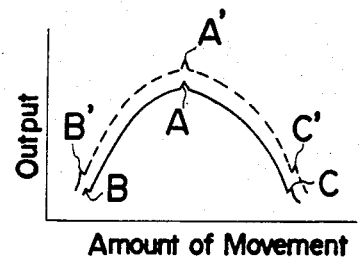

During an inspection procedure, the stylus or measuring point 2a will translate across the optical surface and make physical contact therewith to create output signals which are graphically disclosed in FIGS. 3a through 3c. In these graphs the ordinate represents the outputs of the electrical comparator 2 and the abscissa represents the horizontal positions of the measuring point 2a relative to the plastic lens 1, i.e., the amount of displacement of the plastic lens 1 relative to the measuring point 2a.

In the graphs, A denotes the protrusion in the output curve produced by the projection of discontinuity 1a, B denotes the protrusion in the output curve produced by projection 1b while C represents the protrusion in the output curve produced by the projection 1c. Referring to FIG. 3a, it can be seen that the output relative to projection 1b and 1c is different. This is an indication that the mounting table 6 on which the lens 1 rests is inclined. It is accordingly easily adjusted by the appropriate rotation of the adjusting screw 8. The actual measuring point 2a will pass across the respective projections as it translates the optical surface.

With reference to the output of the electrical comparator 2 disclosed in FIG. 3b, it can be seen that the measuring point 2a has not scanned along the straight line but rather has only contacted the projection 1b alone. This indicates that the measured lens 1 is both horizontally and angularly deviated from the desired position. Again, appropriate correction must be made with regard to the mounting table 6 prior to any mass production run through quality control inspection. As can be readily determined, the inclination and horizontal location of the lens position relative to the form measuring instrument can be easily and accurately adjusted with reference to the measured variations in the output of the electrical comparator 2 relative to the projections formed on the curved surface of the plastic lens 1.

When the plastic lens 1 is adjusted to be precisely positioned at a predetermined position without any deviation or inclination, the output from the electric comparator will assume the form shown by the solid line in FIG. 3c, which is symmetrical with respect to a vertical line running through the peak of protrusion A, since the plastic lens is rotatably symmetrical. A broken line in FIG. 3c further represents the output measurement of the electric comparator 2 from a standard reference model.

Thus, the surface of plastic lens 1 is easily inspected by comparing the output for the lens 1 with the output for the standard reference model. For this purpose, the following steps may be carried out. In the curve shown by the solid line in FIG. 3c, a plurality of reference points are chosen which are at predetermined intervals along the abscissa from one of the peaks such as A. Then, the difference of the heights, i.e., the ordinates between the peak of A and each reference point is read by means of an electric comparator. In practice, the abscissa of FIG. 3 corresponds to the degree of movement of the table 6 or lens 1 and the ordinate corresponds to the output of the electric comparator. The table 6 is laterally moved from a position where the protrusion 1a of the lens 1 carried on the table 6 contacts measuring point 2a to a position which is apart from the former position with a predetermined distance corresponding to the aforementioned predetermined interval. The measuring device may be so constructed that the output signal from the electric comparator is indicated by a numerical value. Thus, in such operation, the device can show two numerical values when the table is in the former position and in the latter position. Therefore, any difference between the two values can be obtained by subtracting one of the numerical values from the other to determine a quantitative value.

Each value of the difference obtained by the above mentioned manner can be compared with the values which are obtained for the standard lens through the same manner as mentioned above. When both of the values of difference relating to the lens 1 and the standard model at each point are equal, then the plastic lens 1 is manufactured or formed with no error.

As another method to inspect lenses, two electric comparators can be provided, one for measuring the surface of the lenses samples and the other for the standard reference lens. The outputs of the comparators are applied to a graphic recorder, such as pen recorder or X-Y plotter, to provide the graph as shown in FIG. 3c, with the relative speed between the recording member and the material on which the graphic is recorded being synchronized with the movement of the lenses relative to the measuring points. In this case, lens positioning may be performed with reference to the projections. In the graph thus obtained, the curvature of the sample lens may be compared with that of the standard lens with respect to the distance therebetween along the ordinate at desired points. It should be noted that in the above embodiment, the surface of plastic lens 1 is measured along a straight line passing over projections 1b, 1a and 1c, i.e., straight line l, but the surface form or curvature can also be measured along the straight line m in the same manner using projections 1d, 1a and 1e. Furthermore, in the above embodiment, projection 1a is formed within the optically effective surface portion of plastic lens 1. However, it is also possible to provide an acceptable measurement using the form measuring instrument by means of projections 1b to 1e alone and omit projection 1a. It is not always necessary to set the reference point within the effective optical portion of plastic lens 1.

Figure 4:
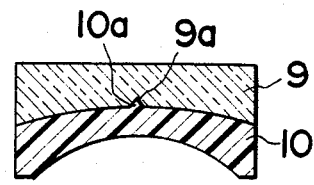
FIG. 4 is a cross-sectional view of an optical element in accordance with a second embodiment of the invention.
Figure 5:
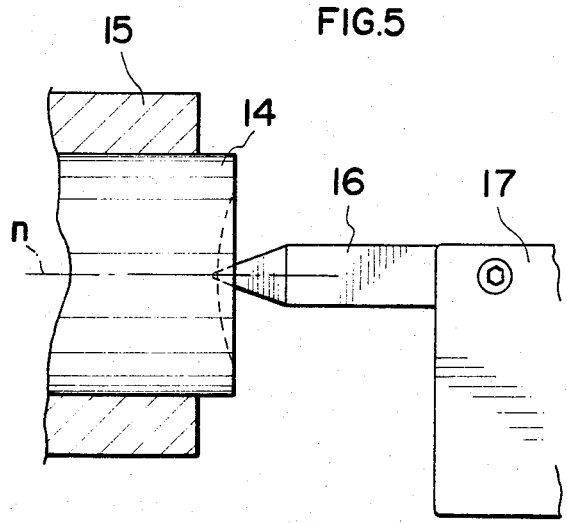
FIG. 5 illustrates a device for manufacturing a metal mold or die used for molding the optical element shown in FIG. 4.

FIGS. 4 and 5 illustrate a second embodiment of the present invention applied to a plastic lens. FIG. 4 shows a cross-sectional view of a plastic lens being inspected and FIG. 5 shows a manufacturing method for a die to mold the plastic lens. In FIG. 4, a plastic lens 10 is provided with a projection 10a formed at the center of the surface, i.e., a position through which the optical axis will pass. A spherical test plate 9 is used to inspect the surface of plastic lens 10 by observing the Newton's ring generated due to the wedged gap between plate 9 and lens 10. The spherical test plate center is provided with a recess 9a that is engageable with projection 10a of plastic lens 10.

With the above method, the plastic lens 10 is easily inspected by observation of Newton's rings with plastic 10 fitted into a spherical test plate 9, the center of the surface of plastic lens 10 exactly coinciding with the center of the surface of spherical test plate 9 when projection 10a of plastic lens 10 is fitted into recess 9a of spherical test plate 9. This center alignment is made simple and convenient, particularly when the surface of an optical element is aspherical.

FIG. 5 illustrates a manufacturing method for a die to mold plastic lens 10 as shown in FIG. 4, using an NC (Numerical Control) lathe. In FIG. 5, chuck 15 of the NC lathe grasps die 14 and is rotated by a drive system (not shown) about an axis, n, of the NC lathe. Cutting tool holder 17 secures an appropriate cutting tool 16 to cut die 14 according to preprogrammed output signals of the NC lathe control. The NC lathe control can be preset to cut die 14 to a predetermined depth (e.g., a few $\mu$ to ten $\mu$) when the edge of cutting tool 16 is positioned at the center, on which die 14 rotates, so that a recess may be formed at the center of the surface of die 14. It should be noted that forming a recess on a die does not always follow the above cutting process and other methods, such as plastic processing, chemical etching, electro-discharge processing, laser beam processing and the like may be used.

Alternatively, a projection may be provided on a predetermined position on a smooth surface of a die or a part of a die surface can remain uncut to make a projection.

Molding a plastic optical element, using a die thus manufactured, forms a projection or a recess at a specified position of the optical device, whereby a highly reliable reference mark may be obtained.

Figure 6:
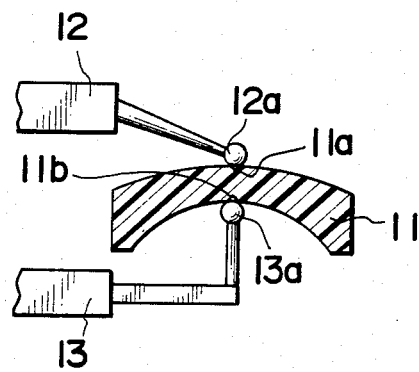
FIG. 6 indicates an arrangement for measuring the curvature of an optical element according to a third embodiment of the present invention.

FIG. 6 shows a third embodiment of the present invention as applied to a plastic lens. A plastic lens 11 is provided with recesses 11a and 11b at the centers, i.e., positions on the optical axis, of both surfaces of plastic lens 11. Electric comparators 12 and 13, identical in form to electric comparator 2 in FIG. 2, include measuring points 12a and 13a, respectively, which are similar to measuring point 2a in FIG. 2. Plastic lens 11 is shifted by a drive system (not shown) towards a direction which meets at right angles with a line passing through measuring points 12a and 12b. Accordingly, in this case, both surfaces of plastic lens 11 are measured simultaneously. Furthermore, a comparison of the outputs of electric comparators 12 and 13 facilitates measurement as to whether the centers of both surfaces of plastic lens 11 are properly co-aligned and positioned at a predetermined optical axis as designed.

Figure 7A:
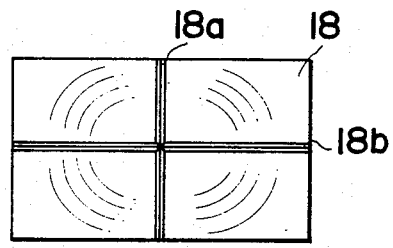
FIGS. 7a and 7b show front elevational views of fourth and fifth embodiments, respectively.
Figure 7B:
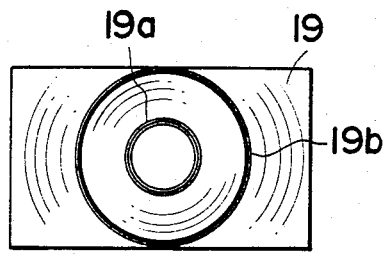

FIGS. 7a and 7b illustrate plastic lenses according to fourth and fifth embodiments of the present invention, respectively. With reference to FIG. 7a, the surface of plastic lens 18 is provided with two linear projections 18a and 18b which intersect at right angles with each other on the optical axis. In FIG. 7b, the surface of plastic lens 19 is provided with two annular projections 19a and 19b forming concentric circles around the optical axis of plastic lens 19.

Furthermore, any spherical test plate (not shown) for inspecting plastic lens 18 or 19 is provided with recesses, into which linear projections 18a and 18b or annular projections 19a and 19b formed on plastic lens 18 or 19 are fittable. The surface of plastic lens 18 or 19 and a spherical test plate (not shown) can be center-aligned when linear projections 18a and 18b or annular projections 19a and 19b of plastic lens 18 or 19 are fitted into the recesses of the spherical test plate corresponding respectively to the plastic lens. Thus, center-alignment is easily made and this method is particularly convenient when the surface of an optical device to be inspected is aspherical. Furthermore, such crucial and concentric circle reference projections formed on the surface of an optical element can be utilized as a reference for the location of the Newton's ring when the optical element surface is inspected using the spherical test plate, thereby facilitating observation.

It should be understood that for an optical element requiring no center-alignment between the optical element and the spherical test plate, e.g., one with a spherical surface, a recess formed on the optical element as shown in FIG. 7a or 7b serves as the reference for observing the Newton's ring.

Figure 8:
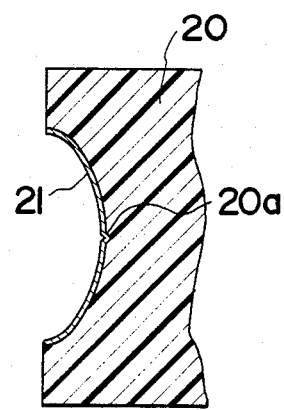
FIG. 8 is a cross-sectional view of a sixth embodiment of the present invention applied to a plastic mirror.

FIG. 8 shows a cross-sectional view of a sixth embodiment of the present invention applied to a mirror molded of plastic. A plastic mirror 20 has a recess 20a formed at the center of a surface used as an optical surface. Reflection layer 21 is formed on the optical surface by vaporizing or coating aluminum or the like.

Thus, if a reference is provided on the surface of a plastic mirror, easy and accurate measurement is possible when the surface is measured using a form measuring instrument.

It should be noted that with the above embodiments, the height and area of a projection or a recess formed within the effective portion of an optical element are set up by taking into consideration the accuracy or capacity of a form measuring instrument for measuring the surface of the optical element, as well as the area of the effective range. The height and area of the projection or recess are very small in comparison with the height measured from lowest portion to highest portion of the spherical surface of the lens and the area of an effective optical portion of an optical element (the height of the projection or recess is about 1/100 of the height of the optical surface and the area thereof is about 1/10000 of that of the effective portion), and thus, the discontinuity in the form of a projection or recess affects the optical performance of the optical device as little as possible. The discontinuity being of sufficient magnitude for measurement to determine a spatial position but limited in size to prevent any significantly perceptible aberrations from being introduced within the desired application of the optical element.

Furthermore, when an optical element according to the above embodiment is used with another optical element for constituting an optical system such as finder optical system of a camera, the height and area of a projection or recess formed on the optical element may be further designed so as to cause no effect on the optical performance of the entire optical system.

According to the present invention, discontinuation elements, such as projections or recesses, which serve as the reference means or index means for the measurement or inspection of an optical element surface are integrally provided on the surface of a plastic optical element. These elements can be used for fitting into complimentary configuration positions on a spherical test plate, or for adjusting a form measuring instrument or for comparisons with predetermined design values, thereby making possible accurate and easy measurement or inspection of the surface of the optical element. Furthermore, since the projections or recesses serving as the above reference means are molded integrally with an optical element, it is not necessary to provide a separate reference, and such integral reference is always provided at a specified position on the optical element and thus becomes highly reliable.

When measuring a surface of an optical element using a form measuring instrument, the reference provided on the optical element need only be used to facilitate an accurate adjustment of the form measuring instrument and subsequent measurement can be made without any special accessories or devices. As a result, it is possible to provide an optical element which is low in cost, and easy and accurate to measure.

In addition, when a projection or recess is provided to indicate the center of an optical element surface, it is very convenient for the center-alignment of the surfaces. Also when provided in the form of 2 straight lines intersecting at right angles with each other or in the form of concentric circle lines around the optical axis, observation of Newton's ring is easy when the surface is inspected using a spherical test plate. Furthermore, with an optical element, such as a plastic lens, whose front and rear surfaces are used as optical surfaces, it is easy to measure center deviations of both surfaces.

Various modifications, within the parameters of the present invention, are possible and accordingly, the scope of the present invention should be measured solely from the following claims.

What is claimed is:

1. A process for mass manufacturing of optical elements and inspecting the accuracy of their optical surfaces, comprising the steps of:
    molding a curved optical body to have a curved optical surface with an integral indexing means on a predetermined position, located at a fixed relative position to a predetermined optical axis of the optical surface, the indexing means forming at least one discontinuity of a predetermined surface configuration of sufficient magnitude for measurement but limited in size to prevent any perceptible aberration to be introduced within the desired application of the optical element;
    positioning the molded optical body in an operative position relative to a measuring instrument that directly contacts the optical surface;
    measuring the optical body to provide a measurement of the optical surface including a measurement of the indexing means to insure a proper alignment, and
    comparing the measurement with a standard reference model measurement to evaluate acceptable surface accuracy.

2. The process of claim 1 wherein a second discontinuity is molded on the optical surface at a fixed predetermined distance from the first discontinuity.

3. The process of claim 1 wherein the first discontinuity is located on the optical axis of the optical surface.

4. The process of claim 1 wherein the discontinuity is a tiny projection from the optical surface.

5. The process of claim 2 wherein the discontinuties are a pair of projection portions provided in symmetrical relation with respect to the optical axis.

6. The process of claim 5 further including a third projection portion located at a position through which the optical axis passes.

7. The process of claim 2 wherein the respective discontinuities are elongated and cross at the optical axis.

8. The process of claim 2 wherein the respective discontinuities are annularly spaced and coaxial with the optical axis.

9. The process of claim 1 where the discontinuity is a recess portion of substantially a V-shaped cross-section found on a position through which the optical axis passes.

10. The process of claim 2 wherein each discontinuity is in the form of a ring concentric to the optical axis.

11. The process of claim 2 wherein each discontinuity is in the form of a meridianal configuration passing through the optical axis.

12. The process of claim 1 wherein the measurement step includes a measurement of the generated Newton's ring from a spherical test plate.

13. A process for mass manufacturing of optical elements and inspecting the accuracy of their optical surfaces, comprising the steps of:
- molding a curve optical body to have a curved optical surface with an integral indexing means on a predetermined position, located at a fixed relative position to a predetermined optical axis of the optical surface, the indexing means forming at least a pair of discontinuities of predetermined surface configurations of sufficient magnitude for measurement but limited in size to prevent any perceptible aberration to be introduced within the desired application of the optical element, the discontinuities providing a fixed relationship with respect to the optical axis;
- positioning the molded optical body in an operative position relative to a measuring instrument that directly contacts the optical surface;
- measring the optical body across the optical axis to provide a measurement of the optical surface including a measurement of the indexing means to insure a proper alignment and a constant contact with the curved optical surface along a predetermined scan line which includes the discontinuities, and
- comparing the measurement with a standard reference model measurement to evaluate acceptable surface accuracy.

14. The process of claim 13 wherein the measuring step includes a second measurement along a second predetermined scan line.

15. The process of claim 13 wherein the comparison of the measurement also includes a comparison of the position of the discontinuities relative to a standard reference model measurement to insure proper alignment of the optical element.

16. The process of claim 15 wherein the measurement value and standard reference model measurement value is expressed in a quantitative value.

17. A production system for the inspection of the accuracy of optical surfaces, comprising:
- a die cavity for molding a curved optical body to have a curved optical surface with an integral indexing means on a predetermined position, located at a fixed relative position to a predetermined optical axis of the optical surface, the indexing means forming at least one discontinuity of a predetermined surface configuration of sufficient magnitude for measurement but limited in size to prevent any perceptible aberration to be introduced within the desired application of the optical element;
- means for positioning a molded optical body in an operative position relative to a measuring instrument that directly contacts the optical surface;
- means for measuring the optical body to provide a measurement of the optical surface including a measurement of the indexing means to insure a proper alignment, and
- means for comparing the measurement with a standard reference model measurement to evaluate acceptable surface accuracy.

* * * * *